(12) United States Patent
Chen et al.

(10) Patent No.: US 6,851,194 B1
(45) Date of Patent: Feb. 8, 2005

(54) RECIPROCATING SAW HAVING A BLADE HOLDING DEVICE

(75) Inventors: Ruey Zon Chen, Taiping (TW); Eric Lo, Taiping (TW); George Ku, Taiping (TW)

(73) Assignee: Motomax Electric Co., Ltd.

( * ) Notice: Subject to any disclaimer, the term of this patent is extended or adjusted under 35 U.S.C. 154(b) by 0 days.

(21) Appl. No.: 10/678,149

(22) Filed: Oct. 6, 2003

(51) Int. Cl.[7] .............................................. B23D 49/16
(52) U.S. Cl. ............................ 30/392; 279/71; 279/87
(58) Field of Search ...................... 30/392–394; 279/71, 279/74, 75, 30, 82, 87

(56) References Cited

U.S. PATENT DOCUMENTS

| | | | |
|---|---|---|---|
| 3,552,147 A | * | 1/1971 | Johansson et al. ............. 464/35 |
| 6,209,208 B1 | * | 4/2001 | Marinkovich et al. ......... 30/392 |
| 6,260,281 B1 | * | 7/2001 | Okumura et al. .............. 30/392 |
| 6,276,065 B1 | * | 8/2001 | Osada et al. ................... 30/392 |
| 6,612,039 B2 | * | 9/2003 | Kakiuchi et al. .............. 30/392 |

* cited by examiner

Primary Examiner—Douglas D Watts
(74) Attorney, Agent, or Firm—Charles E. Baxley

(57) ABSTRACT

A reciprocating saw includes a main body, a blade holding device mounted on the main body, and a blade detachably mounted on the support seat of the main body by the blade holding device. The blade holding device includes a bushing, a slide, a sleeve, a positioning ball, a torsion spring, and a guide rod. Thus, the blade can be mounted on and detached from the support seat of the main body easily and conveniently by rotation of the sleeve, thereby facilitating the user replacing the blade.

8 Claims, 5 Drawing Sheets

RECIPROCATING SAW HAVING A BLADE HOLDING DEVICE

BACKGROUND OF THE INVENTION

1. Field of the Invention

The present invention relates to a reciprocating saw having a blade holding device, and more particularly to a reciprocating saw, wherein the blade can be mounted on and detached from the support seat of the main body easily and conveniently by rotation of the sleeve, thereby facilitating the user replacing the blade.

2. Description of the Related Art

A conventional reciprocating saw comprises a main body, a strip-shaped blade mounted on an end of the main body, and a reciprocating mechanism mounted between the main body and the blade, so that the blade may be moved reciprocally in a linear manner so as to cut the workpiece. However, the blade is easily worn out during a long-term utilization, so that it is necessary to detach the blade from the main body for replacement. Thus, the main body is provided with a holding mechanism for positioning and releasing the blade.

SUMMARY OF THE INVENTION

The primary objective of the present invention is to provide a reciprocating saw having a blade holding device.

Another objective of the present invention is to provide a reciprocating saw, wherein the blade can be mounted on and detached from the support seat of the main body easily and conveniently by rotation of the sleeve, thereby facilitating the user replacing the blade.

A further objective of the present invention is to provide a reciprocating saw, wherein the sleeve can be returned to the original position by the restoring force of the torsion spring, thereby facilitating the user mounting the blade.

A further objective of the present invention is to provide a reciprocating saw, wherein the sleeve is retained by the elastic force of the torsion spring, so that the sleeve cannot be rotated unintentionally, thereby preventing the blade from being detached from the support seat of the main body so as to provide a safety effect.

In accordance with the present invention, there is provided a reciprocating saw, comprising a main body, a blade holding device mounted on the main body, and a blade detachably mounted on the support seat of the main body by the blade holding device, wherein:

the main body has a side provided with a support seat having a first end formed with a locking hole and a second end formed with a receiving hole;

the blade has an end formed with a positioning hole;

the blade holding device includes a bushing, a slide, a sleeve, a positioning ball, a torsion spring, and a guide rod, wherein:

the bushing is secured on the support seat of the main body and has an inner wall formed with a longitudinal slide slot and a periphery formed with a longitudinal guide slot communicating with the slide slot;

the slide is slidably mounted in the slide slot of the bushing and has a side formed with an arcuate concave urging face;

the sleeve is rotatably mounted on the bushing and has a first end having a periphery formed with a helical guide groove and a second end having a periphery formed with an arc-shaped retaining groove, the first end of the sleeve has an end face formed with a locking hole;

the positioning ball is movably mounted in the receiving hole of the support seat of the main body and has a first side urged by the urging face of the slide and a second side locked in the positioning hole of the blade;

the torsion spring is mounted on the support seat of the main body and has a first end inserted into the locking hole of the main body and a second end inserted into the locking hole of the sleeve; and the guide rod is extended through the guide groove of the sleeve, the guide slot of the bushing and the slide.

Further benefits and advantages of the present invention will become apparent after a careful reading of the detailed description with appropriate reference to the accompanying drawings.

DETAILED DESCRIPTION OF THE INVENTION

Figure 1:
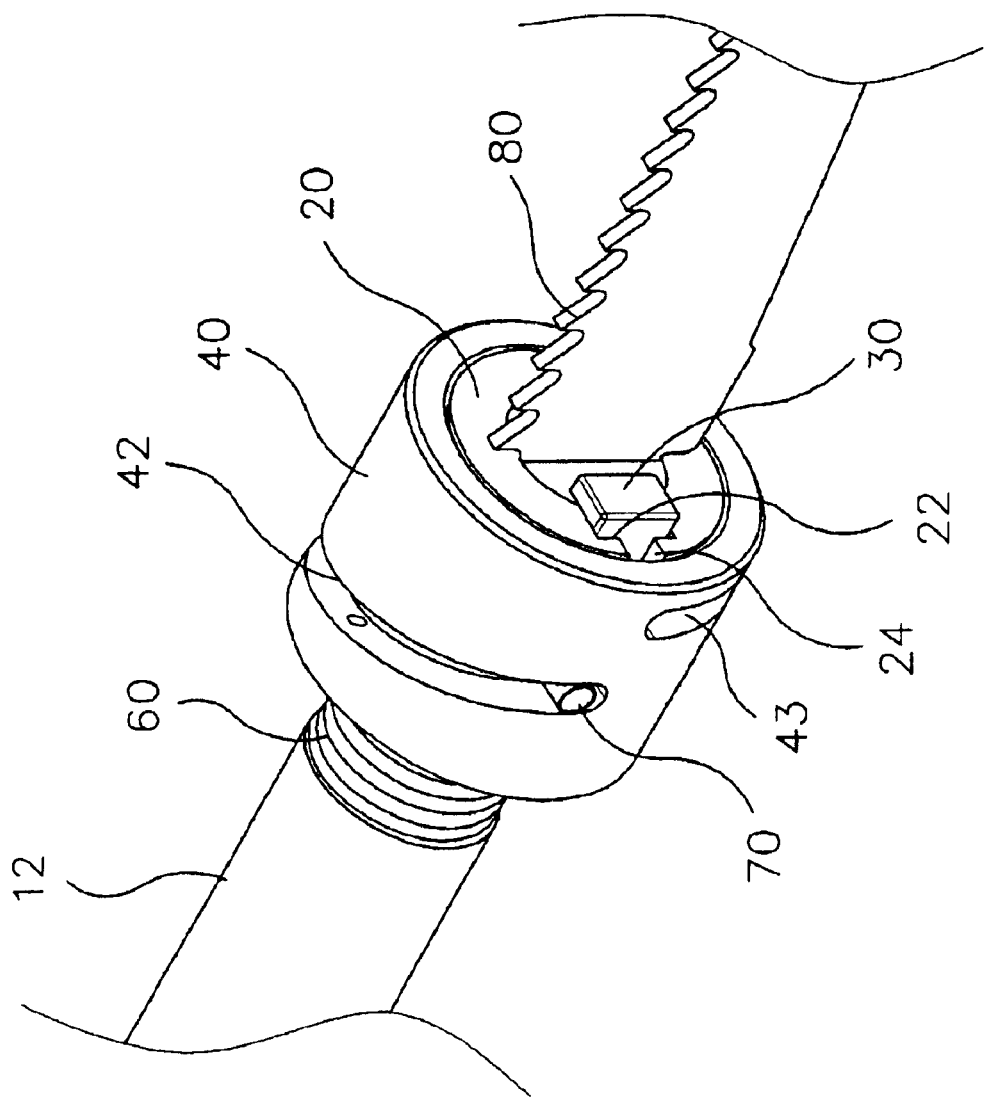
FIG. 1 is a partially cut-away perspective view of a reciprocating saw in accordance with the preferred embodiment of the present invention.
Figure 2:
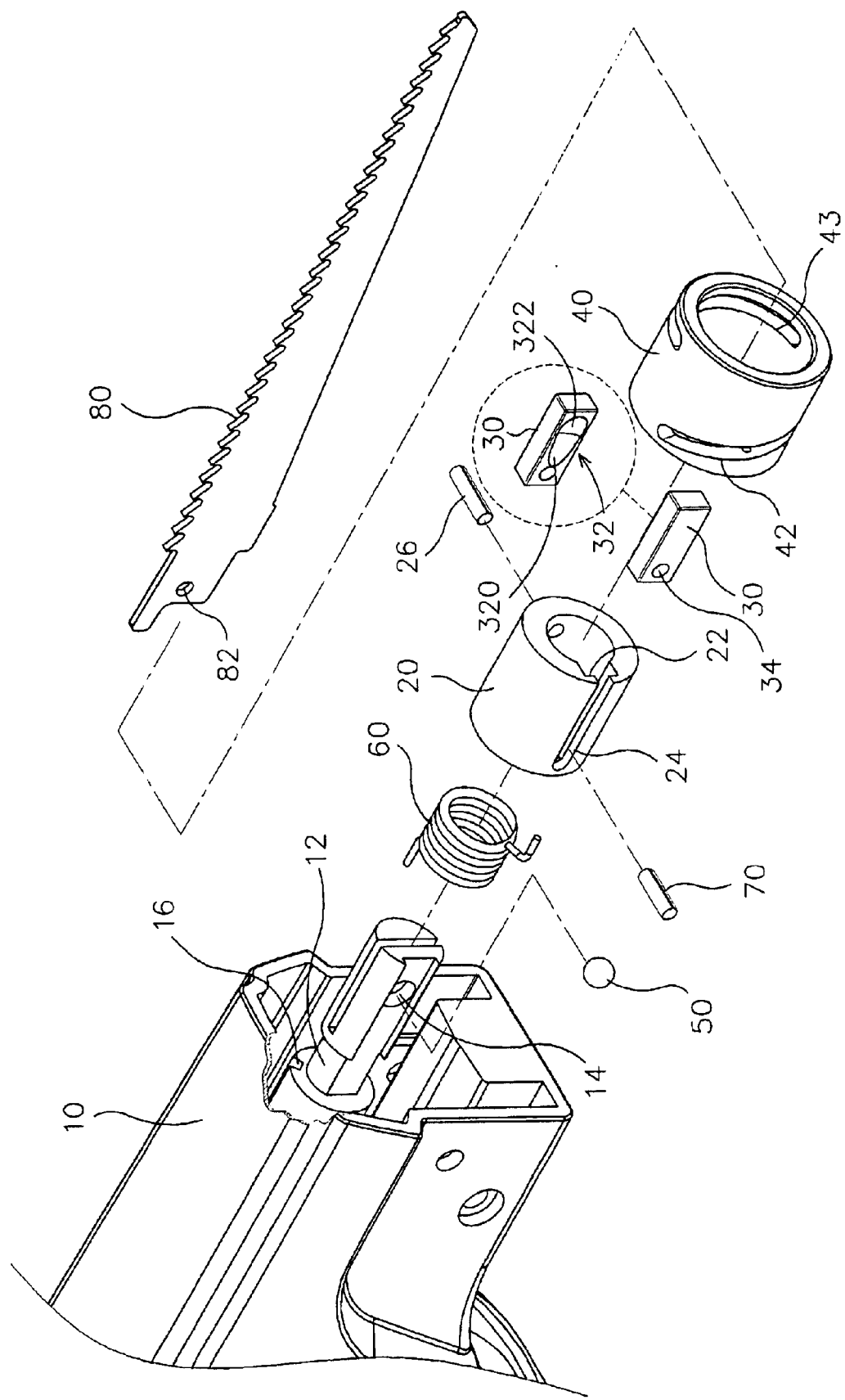
FIG. 2 is a partially cut-away exploded perspective view of the reciprocating saw in accordance with the preferred embodiment of the present invention.
Figure 3:
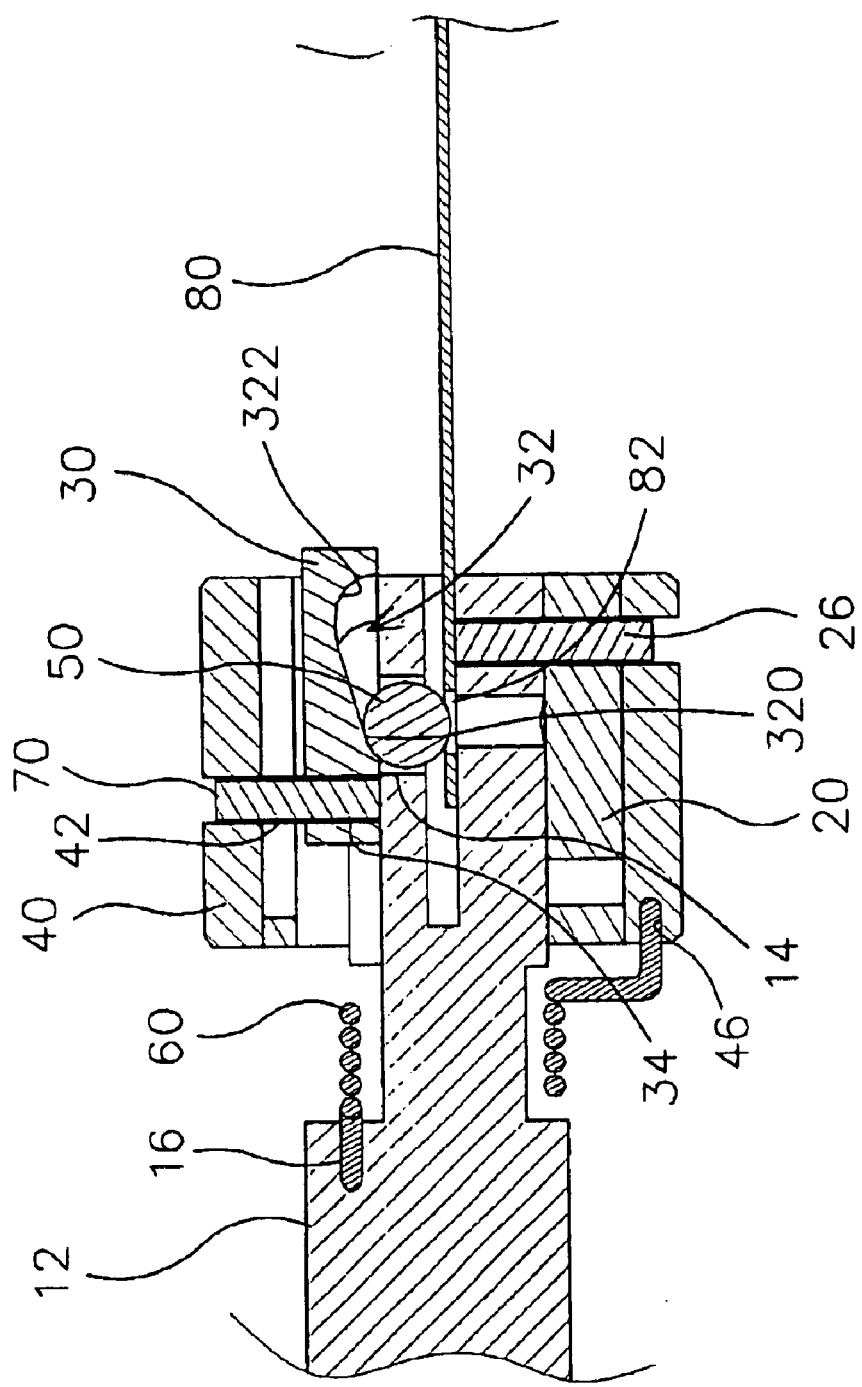
FIG. 3 is a plan cross-sectional view of the reciprocating saw as shown in FIG. 1.

Referring to the drawings and initially to FIGS. 1–3, a reciprocating saw in accordance with the preferred embodiment of the present invention comprises a main body 10, a blade holding device mounted on the main body 10, and a blade 80 detachably mounted on the support seat 12 of the main body 10 by the blade holding device.

The main body 10 has a side provided with a support seat 12 having a first end formed with a locking hole 16 and a second end formed with a receiving hole 14.

The blade 80 has an end formed with a positioning hole 82.

The blade holding device includes a bushing 20, a slide 30, a sleeve 40, a positioning ball 50, a torsion spring 60, and a guide rod 70.

The bushing 20 is secured on the support seat 12 of the main body 10 and has an inner wall formed with a longitudinal slide slot 22 and a periphery formed with a longitudinal guide slot 24 communicating with the slide slot 22. Preferably, the slide slot 22 of the bushing 20 has a width greater than that of the guide slot 24.

The slide 30 is slidably mounted in the slide slot 22 of the bushing 20 and has a side formed with an arcuate concave urging face 32 having a first end formed with a first urging portion 320 and a second end formed with a second urging portion 322. Preferably, the second urging portion 322 of the urging face 32 of the slide 30 has a depth greater than that of the first urging portion 320.

The sleeve 40 is rotatably mounted on the bushing 20 and has a first end having a periphery formed with a helical guide groove 42 and a second end having a periphery formed with an arc-shaped retaining groove 43. The first end of the sleeve 40 has an end face formed with a locking hole 46.

The blade holding device further includes a pin 26 extended through the retaining groove 43 of the sleeve 40, the bushing 20 and the support seat 12 of the main body 10, so that the bushing 20 is secured on the support seat 12 of the main body 10, and the sleeve 40 is rotatably mounted on the bushing 20.

The positioning ball 50 is movably mounted in the receiving hole 14 of the support seat 12 of the main body 10 and has a first side urged by the urging face 32 of the slide 30 and a second side locked in the positioning hole 82 of the blade 80.

The torsion spring 60 is mounted on the support seat 12 of the main body 10 and has a first end inserted into the locking hole 16 of the main body 10 and a second end inserted into the locking hole 46 of the sleeve 40.

The guide rod 70 is extended through the guide groove 42 of the sleeve 40, the guide slot 24 of the bushing 20 and the slide 30. The slide 30 has an end formed with a through hole 34 for passage of the guide rod 70.

Figure 4:
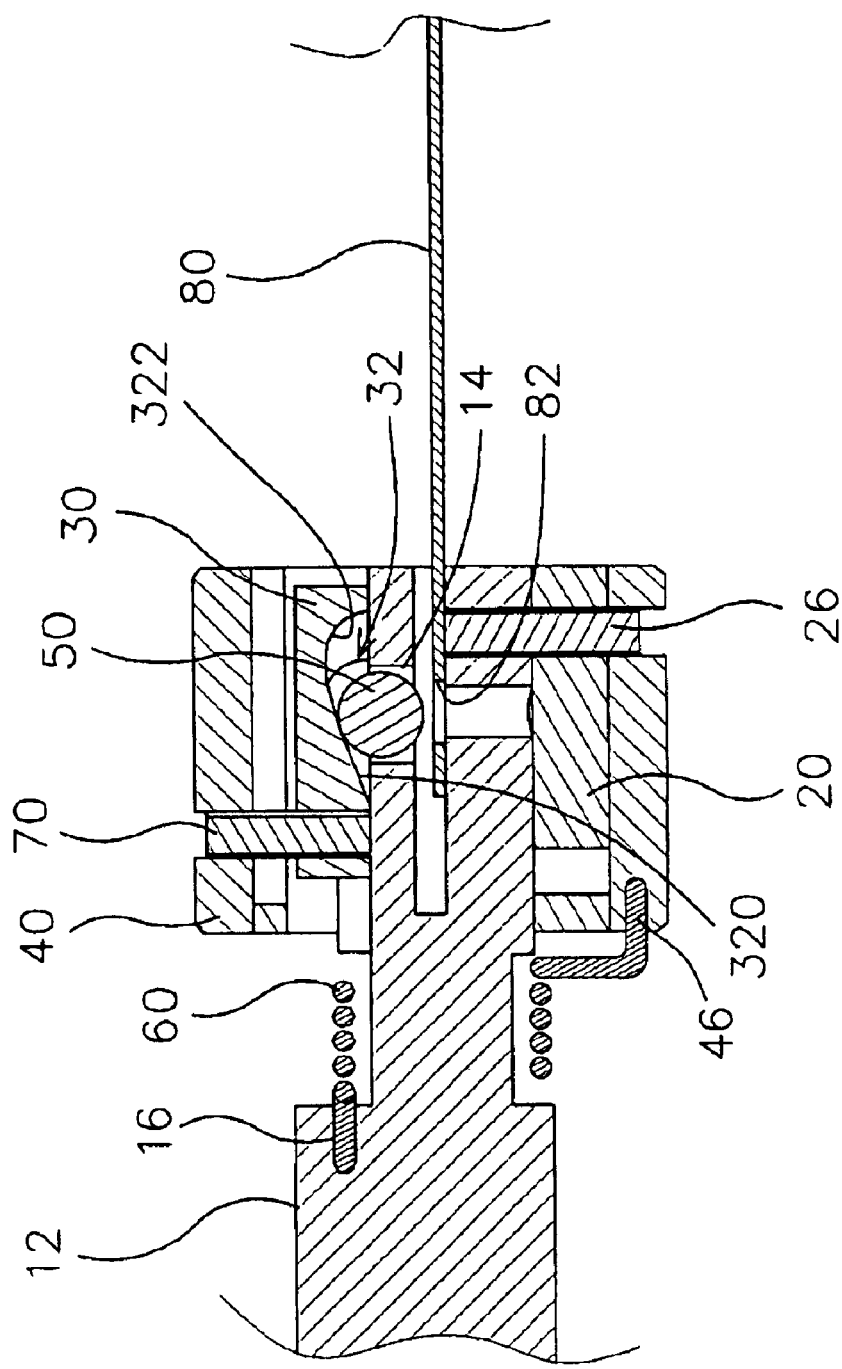
FIG. 4 is a schematic operational view of the reciprocating saw as shown in FIG. 3 in use.
Figure 5:
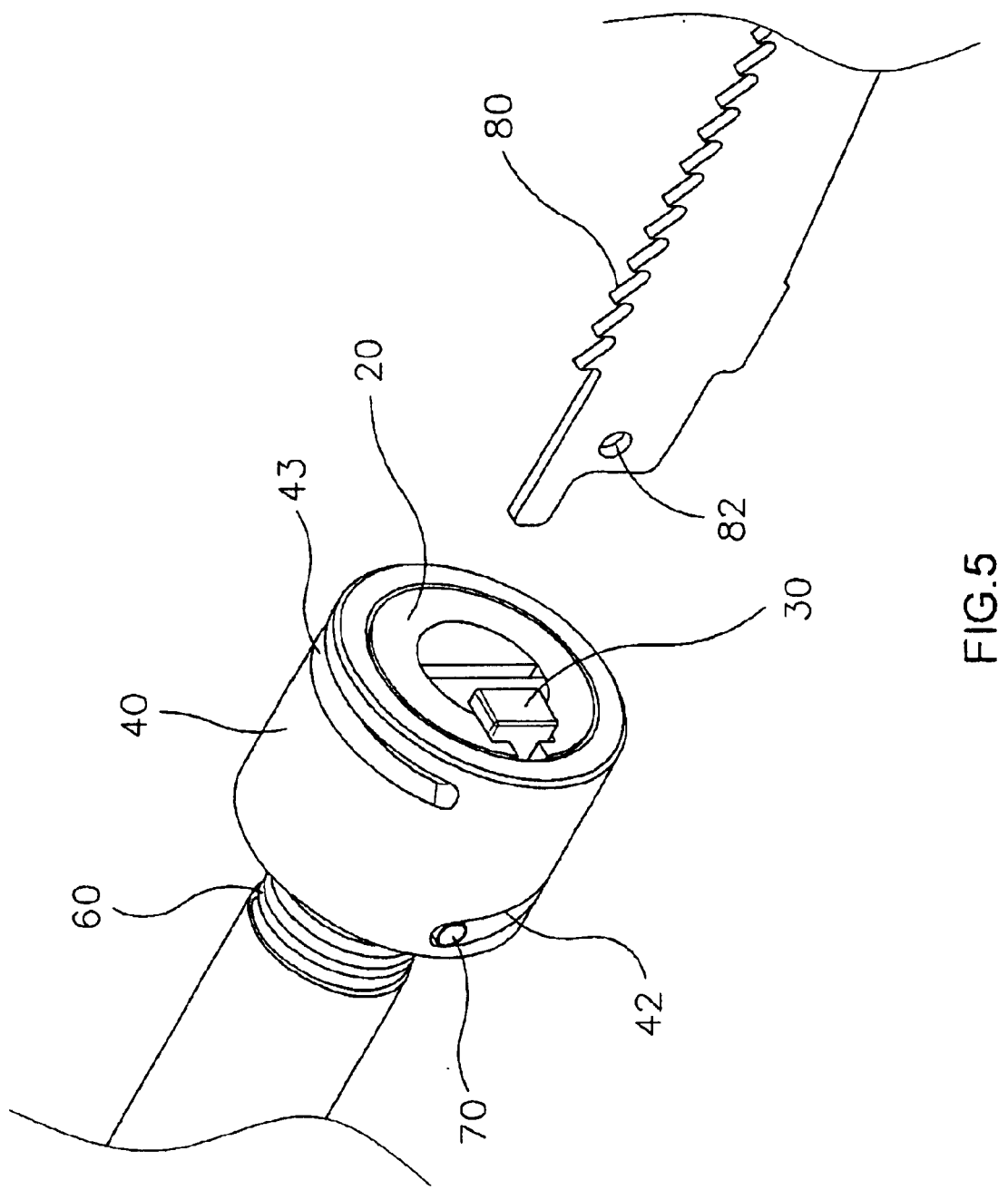
FIG. 5 is a detached view of the reciprocating saw as shown in FIG. 1.

In operation, referring to FIGS. 1–5, when the sleeve 40 is rotated relative to the bushing 20 in one direction, the guide groove 42 of the sleeve 40 is rotated by rotation of the sleeve 40, so that the guide rod 70 is urged by the guide groove 42 of the sleeve 40 to move in the guide slot 24 of the bushing 20 in a linear manner. Thus, the slide 30 is driven by movement of the guide rod 70 to move in the slide slot 22 of the bushing 20 in a linear manner, so that the slide 30 is moved from the position as shown in FIG. 3 to the position as shown in FIG. 4, where the positioning ball 50 is rested on the second urging portion 322 of the urging face 32 of the slide 30 and is detached from the positioning hole 82 of the blade 80. Thus, the blade 80 can be detached from the support seat 12 of the main body 10 as shown in FIG. 5.

Alternatively, after the blade 80 is inserted into the support seat 12 of the main body 10, the sleeve 40 is rotated relative to the bushing 20 in the opposite direction by the restoring force of the torsion spring 60, and the guide groove 42 of the sleeve 40 is rotated by rotation of the sleeve 40, so that the guide rod 70 is urged by the guide groove 42 of the sleeve 40 to move in the guide slot 24 of the bushing 20 in a linear manner. Thus, the slide 30 is driven by movement of the guide rod 70 to move in the slide slot 22 of the bushing 20 in a linear manner, so that the slide 30 is moved from the position as shown in FIG. 4 to the position as shown in FIG. 3, where the positioning ball 50 is urged by the first urging portion 320 of the urging face 32 of the slide 30 and is locked in the positioning hole 82 of the blade 80. Thus, the blade 80 is secured on the support seat 12 of the main body 10 as shown in FIG. 1.

Accordingly, the blade 80 can be mounted on and detached from the support seat 12 of the main body 10 easily and conveniently by rotation of the sleeve 40, thereby facilitating the user replacing the blade 80. In addition, the sleeve 40 can be returned to the original position by the restoring force of the torsion spring 60, thereby facilitating the user mounting the blade 80. Further, the sleeve 40 is retained by the elastic force of the torsion spring 60, so that the sleeve 40 cannot be rotated unintentionally, thereby preventing the blade 80 from being detached from the support seat 12 of the main body 10 so as to provide a safety effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A reciprocating saw, comprising a main body, a blade holding device mounted on the main body, and a blade detachably mounted on the support seat of the main body by the blade holding device, wherein:

the main body has a side provided with a support seat having a first end formed with a locking hole and a second end formed with a receiving hole;

the blade has an end formed with a positioning hole;

the blade holding device includes a bushing, a slide, a sleeve, a positioning ball, a torsion spring, and a guide rod, wherein:

the bushing is secured on the support seat of the main body and has an inner wall formed with a longitudinal slide slot and a periphery formed with a longitudinal guide slot communicating with the slide slot;

the slide is slidably mounted in the slide slot of the bushing and has a side formed with an arcuate concave urging face;

the sleeve is rotatably mounted on the bushing and has a first end having a periphery formed with a helical guide groove and a second end having a periphery formed with an arc-shaped retaining groove, the first end of the sleeve has an end face formed with a locking hole;

the positioning ball is movably mounted in the receiving hole of the support seat of the main body and has a first side urged by the urging face of the slide and a second side locked in the positioning hole of the blade;

the torsion spring is mounted on the support seat of the main body and has a first end inserted into the locking hole of the main body and a second end inserted into the locking hole of the sleeve; and the guide rod is extended through the guide groove of the sleeve, the guide slot of the bushing and the slide.

2. The reciprocating saw in accordance with claim 1, wherein the slide slot of the bushing has a width greater than that of the guide slot.

3. The reciprocating saw in accordance with claim 1, wherein the urging face of the slide has a first end formed with a first urging portion and a second end formed with a second urging portion.

4. The reciprocating saw in accordance with claim 3, wherein the second urging portion of the urging face of the slide has a depth greater than that of the first urging portion.

5. The reciprocating saw in accordance with claim 3, wherein when the sleeve is rotated relative to the bushing in one direction, the guide groove of the sleeve is rotated by rotation of the sleeve, so that the guide rod is urged by the guide groove of the sleeve to move in the guide slot of the bushing in a linear manner, and the slide is driven by movement of the guide rod to move in the slide slot of the bushing in a linear manner, so that the slide is moved to a position where the positioning ball is rested on the second urging portion of the urging face of the slide and is detached from the positioning hole of the blade.

6. The reciprocating saw in accordance with claim 5, wherein the sleeve is rotated relative to the bushing in an opposite direction by the restoring force of the torsion spring, and the guide groove of the sleeve is rotated by rotation of the sleeve, so that the guide rod is urged by the guide groove of the sleeve to move in the guide slot of the bushing in a linear manner, and the slide is driven by movement of the guide rod to move in the slide slot of the bushing in a linear manner, such that the slide is moved to a position where the positioning ball is urged by the first urging portion of the urging face of the slide and is locked in the positioning hole of the blade.

7. The reciprocating saw in accordance with claim 1, wherein the blade holding device further includes a pin extended through the retaining groove of the sleeve, the bushing and the support seat of the main body, so that the bushing is secured on the support seat of the main body, and the sleeve is rotatably mounted on the bushing.

8. The reciprocating saw in accordance with claim 1, wherein the slide has an end formed with a through hole for passage of the guide rod.

* * * * *